United States Patent Office 3,244,617
Patented Apr. 5, 1966

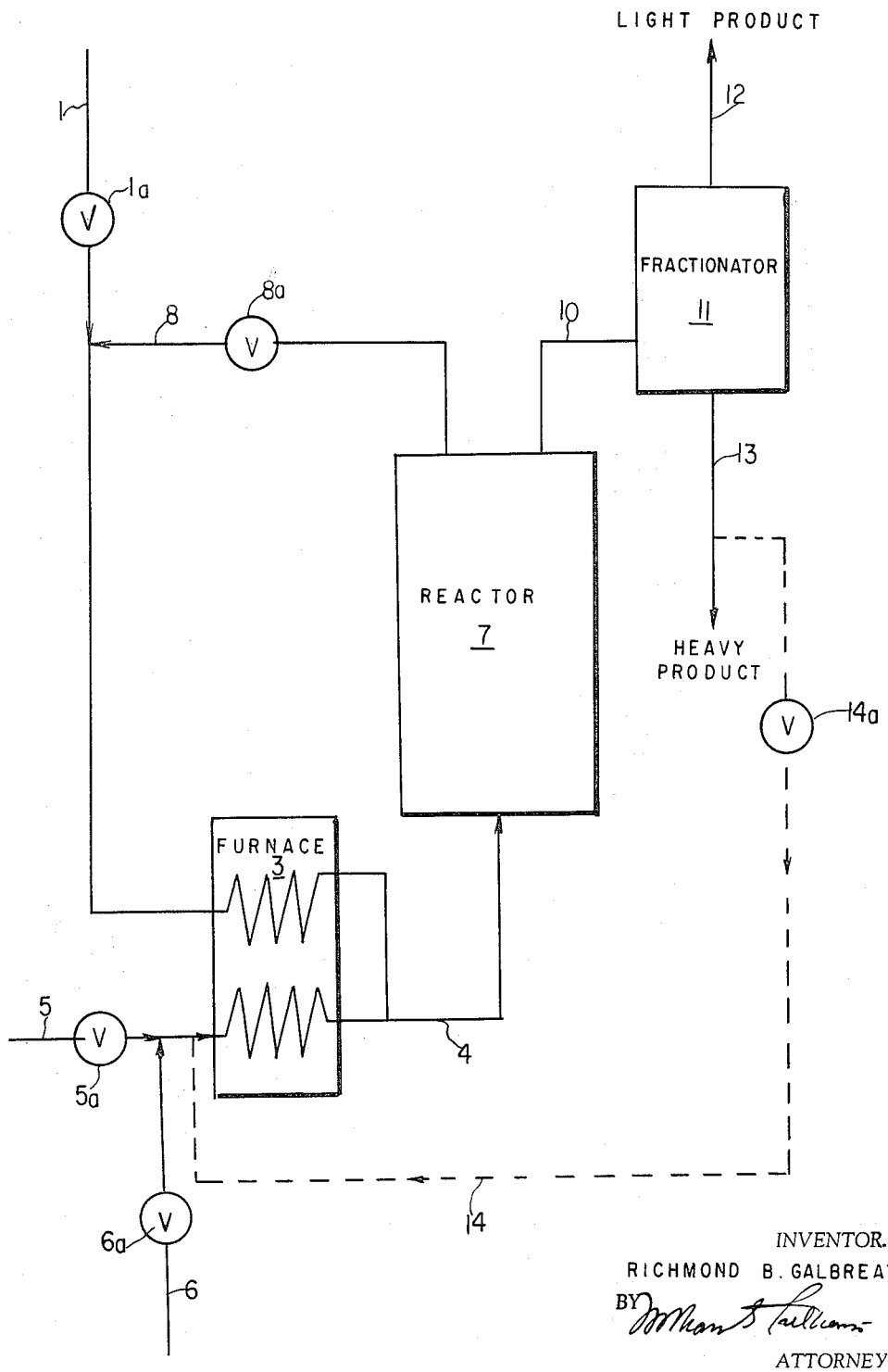

3,244,617
START-UP OF A HYDROGENATION-HYDRO-
CRACKING REACTION
Richmond B. Galbreath, Fanwood, N.J., assignor, by
mesne assignments, to Cities Service Research and
Development Company, a corporation of Delaware
Filed June 11, 1963, Ser. No. 287,003
14 Claims. (Cl. 208—143)

This invention relates to a method of start-up of a hydrogenation-hydrocracking reaction and, more particularly, to a method of start-up for the hydrogenation-hydrocracking of heavy liquid hydrocarbon oils in the presence of a hydrogenation-hydrocracking catalyst.

The techniques for conducting the liquid phase hydrogenation of hydrocarbon oils in the presence of numerous hydrogenation catalysts, under a wide range of operating conditions, are well known and established in the art. These techniques have been used in the treatment of both light and heavy hydrocarbon oils.

Relatively unsaturated oils, such as cracked gas oils, are generally hydrogenated under moderate conditions of temperature and pressure to improve their color or stability. In such instances, unsaturated molecules present in these oils combine chemically with hydrogen in an exothermic reaction.

Heavy hydrocarbon feeds, such as residual fractions, are generally subjected to a more severe treatment. Such feeds are reacted with hydrogen and a hydrogenation catalyst at elevated temperatures and pressures to hydrocrack high molecular weight, mostly saturated hydrocarbon molecules to lower molecular weight, more unsaturated hydrocarbons. The lighter, unsaturated molecules, which tend to rearrange into more stable form, subsequently combine with hydrogen in an exothermic reaction in the same manner as occurs in the hydrogenation of originally unsaturated oils. At the same time, sulfur present in the oil combines with hydrogen and is removed as hydrogen sulfide.

In the hydrogenation-hydrocracking of heavy hydrocarbon oils, it has been found necessary to heat the reactants to the temperature at which hydrocracking of the heavy oils takes place. Heating to the temperature at which hydrogenation of the unsaturates present in the heavy hydrocarbon oils occurs is not sufficient to initiate the hydrocracking of the saturated, high molecular weight molecules, despite the exothermic nature of the hydrogenation of unsaturates. This additional increment of temperature required to initiate the hydrogenation-hydrocracking of heavy hydrocarbon oils results, for a commercial size unit at the desired operating conditions, in a considerable increase in heat requirements and furnace capacity as opposed to that required for the hydrogenation of unsaturated hydrocarbon oils.

In accordance with this invention, it has been discovered that the hydrogenation-hydrocracking of heavy hydrocarbon oils can be initiated with a minimum requirement of external heat. By incorporating the specific start-up procedure recited and claimed herein, it is thus possible to affect a considerable reduction in furnace capacity and initial operating cost when hydrogenating-hydrocracking heavy hydrocarbon oils in a commercial size unit.

According to the present invention, the hydrogenation-hydrocracking of heavy hydrocarbon oils is initiated by utilizing a start-up procedure in which the initial charge stock comprises unsaturated hydrocarbon oils having a sufficient amount of unsaturated molecules to chemically accept hydrogen in an exothermic reaction without cracking of the molecules. This reaction is allowed to proceed until the temperature within the reactor reaches the point where the cracking of heavy hydrocarbon oils will occur. The heavy hydrocarbon oils are then slowly admixed with the light oils in the charge stock so as to initiate the hydrocracking and subsequent hydrocracking of the heavy oils.

The terms "unsaturated hydrocarbon oil" and "heavy hydrocarbon oil" are used herein to denote the relative proportion of unsaturates contained in the oils. The unsaturates present in hydrocarbon oils are, for the most part, aromatics although a minor proportion of olefins may be present, particularly in the unsaturated hydrocarbon oils.

Therefore, a heavy hydrocarbon oil is defined as a heavy hydrocarbon oil having a molecular weight of at least 200 and containing less than approximately 20 mole percent unsaturates. Heavy hydrocarbon oils for which the start-up procedure of the present invention may be used include residual fuel oil; uncracked gas oil; shale oil; bitumen, including that which occurs naturally, such as that found in the Athabasca tar sands, visbreaker tar and other so-called "bottom of the crude barrel" materials.

An unsaturated hydrocarbon oil is defined as a hydrocarbon oil containing approximately 20 mole percent or more unsaturates. Examples of suitable unsaturated hydrocarbon oils which may be used in accordance with the present invention include heavy and light catalytically cracked gas oil and heavy and light coker gas oil.

For a better understanding of the invention, reference should be had to the accompanying drawing in which an embodiment of a hydrogenation-hydrocracking system in which the present invention may be employed is shown diagramamtically.

In the drawing, the unit shown includes a reactor 7 containing hydrogenation catalyst. A hydrogen-rich gas enters the reactor through conduit 4 after passing through furnace 3 by means of conduit 2. The gas may be a hydrogen-containing gas supplied through conduit 1 and valve 1a or it may be a recycle gas leaving the reactor through conduit 8 and valve 8a. Gases leaving reactor 7 which are not to be recycled are withdrawn from the system by means of conduit 9 and valve 9a.

The hydrocarbon charge stock enters reactor 7 through conduit 4 after passing through furnace 3. The heavy hydrocarbon oils are supplied to the feed conduit by means of conduit 6 and valve 6a.

Light hydrocarbon oils employed during start-up in accordance with the present invention are supplied by conduit 5 and valve 5a.

The liquid products leaving reactor 7 after liquid phase hydrogenations pass through conduit 10 to fractionator 11 from which light product is removed overhead through conduit 12 and heavy product is removed through conduit 13.

During start-up heavy product may be returned to feed line 4 by means of conduit 14 and valve 14a for further treatment.

According to the start-up procedure hereinafter claimed, an initial inventory of hydrogenation catalyst is added to reactor 7. Any suitable natural or synthetic catalyst may be employed, the composition, size, and quantity of the catalyst particles forming no part of the present invention. Suitable catalysts include, for example, cobalt, iron, molybdenum, nickel, tungsten, cobalt-molybdate, as well as their sulfides and oxides used alone or together with other suitable catalysts such as naturally occurring clays, silica, etc., or in combination with each other. The catalysts may be in the form of finely divided particles in the size range up to about 300 microns or in the form of larger sized particles such as those used in fixed bed operations.

Hydrogen, introduced to the system by means of conduit 1 and valve 1a, is then flowed through reactor 7 by means of conduit 4 after passing in conduit 2 through furnace 3. The hydrogen introduced may be pure hydrogen or a hydrogen-containing gas.

Once the flow has been established through reactor 7, recycle gas may be used by means of conduit 8 and valve 8a. After hydrogenation has been commenced, the recycle gas will contain normally gaseous hydrocarbons and inert gases in addition to hydrogen.

If desired, the initial catalyst inventory may be added to reactor 7 after the flow of hydrogen through the reactor has been established. Large quantities of catalyst can not be added at a subsequent point in the start-up procedure, however, without adversely effecting the efficiency of the start-up.

The pressure in the reactor is next raised to the desired operating pressure for the desired reaction. At the same time, the hydrogen gas entering the reactor is heated by means of furnace 3. The heated gas warms the thick reactor 7, initiates thermal expansion in the system and vaporizes all residual water vapor which is removed from the system by means of conduit 9 and valve 9a. After a temperature of from about 300 to about 550° F. is reached, all residual water will have been removed from the system, and the gas leaving the reactor may be recycled through conduit 8 and valve 8a.

When the temperature in the reactor has reached this point, unsaturated hydrocarbon oils are fed by means of conduit 5 and valve 5a into conduit 4 which passes through furnace 3 and into reactor 7. The hydrogenation of the unsaturated oils in an exothermic reaction causes the temperature within the reactor to rise.

When the temperature within the reactor reaches, or slightly exceeds, the temperature at which cracking of heavy hydrocarbon oils will occur, heavy hydrocarbon oils are admixed, by means of conduit 6 and valve 6a, with the unsaturated oils entering the reactor through conduit 4. The relative amount of heavy feed stock may be increased as hydrocracking and subsequent hydrogenation of the heavy hydrocarbon oils is initiated, the rate of heavy feed addition being consistent with the maintenance of the reaction temperature. The hydrocracking and subsequent hydrogenation of the heavy hydrocarbon oils tend to modulate the temperature in the reactor to the desired range.

The present invention may be used in connection with the hydrocracking of heavy oils under any suitable operating conditions, the particular techniques and conditions employed after start-up not being a part of the present invention. For example, hydrogen may be introduced at any suitable rate for the particular reaction, such as between about 1,000 and about 10,000 standard cubic feet per barrel of feed. The space velocity in the reactor may vary considerably such as between about 0.5 and about 6.0 volumes of feed per hour per volume of reactor capacity.

Reactor 7 may be maintained at any suitable pressure, such as between about 500 and about 4,000 p.s.i.g. partial pressure of hydrogen, with between about 1,000 and about 3,000 p.s.i.g. being generally preferred. The temperature required to initiate hydrocracking of heavy hydrocarbon oils in the desired operating pressure range will generally range from about 775 to 825° F. Unsaturated hydrocarbon oils, on the other hand, may generally be hydrogenated at initial temperatures of from about 550 to about 750° F.

By incorporating the unique and novel start-up procedure herein recited and claimed, it is generally possible to reduce the initial temperature requirements in the reactor by about 50° F. and in most cases by considerably more. This temperature increment, at the normal operating conditions described above and in view of the complications of metallurgy at these conditions, permits the use of a considerably smaller and less costly furnace and results in an appreciable reduction in start-up cost when conducting commercial-scale operations.

It will be understood that various changes in the method and arrangements of parts, herein described and illustrated in order to explain the nature of the invention, may be made by those skilled in the art within the principle and scope of the invention as expressed in the appended claims.

I claim:
1. A method for initiating the hydrogenation-hydrocracking of heavy hydrocarbon oils in the presence of solid catalyst particles comprising in sequence:
   (1) Adding an initial hydrogenation catalyst inventory to the hydrogenation-hydrocracking reactor;
   (2) Flowing a hydrogen-containing gas through the reaction system at the desired rate for the particular reaction;
   (3) Increasing the pressure in the reactor to the desired operating pressure;
   (4) Heating the hydrogen-containing gas entering the reactor to the temperature at which hydrogenation of unsaturated hydrocarbon oils will occur, thereby initiating thermal expansion in the system and removing residual water vapor present in the reactor;
   (5) Adding unsaturated hydrocarbon oils containing at least 20 mol percent unsaturates to the reactor thereby causing an exothermic hydrogenation reaction to occur which causes the temperature in the reactor to rise to the point where hydrocracking of heavy hydrocarbon oils will occur;
   (6) Admixing heavy hydrocarbon oils containing sulfur and less than 20 mol percent unsaturates with the unsaturated hydrocarbon oils entering the reactor, gradually increasing the relative amount of heavy hydrocarbon oils so that the hydrocracking and subsequent hydrogenation of the heavy hydrocarbon oils tend to modulate the temperature in the reactor to the desired range;
whereby the external heat requirements and, consequently, the size of the furnace required for heating the liquids and gases entering the reactor may be minimized.

2. The method of claim 1 in which the hydrogen-containing gas is a recycle gas containing normally gaseous hydrocarbons as well as hydrogen.

3. The method of claim 1 in which the hydrogen-containing gas is pure hydrogen.

4. A method for initiating the hydrogenation of heavy hydrocarbon oils in the presence of solid catalyst particles comprising in sequence:
   (1) Adding an initial hydrogenation catalyst inventory to the hydrogenation-hydrocracking reactor;
   (2) Flowing a hydrogen-containing gas through the reaction system at the desired rate for the particular reaction;
   (3) Increasing the pressure in the reactor to between about 500 and about 4,000 p.s.i.g. partial pressure of hydrogen;
   (4) Heating the hydrogen-containing gas entering the reactor to so as to raise the temperature within the reactor to between about 300 and about 550° F., said increase in temperature serving to initiate thermal expansion in the system and to remove residual water vapor present in the reactor;
   (5) Adding unsaturated hydrocarbon oils containing at least 20 mol percent unsaturates to the reactor while continuing the heating until an exothermic hydrogenation reaction occurs in the temperature range of between about 550 and about 750° F., and allowing the temperature within the reactor to rise to approximately 775 to 825° F., or slightly higher by means of this exothermic reaction;
   (6) Admixing heavy hydrocarbon oils containing sulfur and less than 20 mol percent unsaturates with the unsaturated hydrocarbon oils entering the reactor and gradually increasing the relative amount of heavy hydrocarbon oils so that the hydrocracking and subsequent hydrogenation of the heavy hydrocarbon oils tends to modulate the temperature in the reactor to approximately 775 to 825° F., or slightly higher;

whereby the external heat requirements and, consequently, the size of the furnace required for heating the liquid and gases entering the reactor may minimized.

5. The method of claim 4 in which the heavy hydrocarbon oil is the bitumen occuring in Athabasca tar sands.

6. The method of claim 4 in which the heavy hydrocarbon oil is residual fuel oil.

7. The method of claim 4 in which the heavy hydrocarbon oil is shale oil.

8. The method of claim 4 in which the heavy hydrocarbon oil is visbreaker tar.

9. The method of claim 4 in which the heavy hydrocarbon oil is uncracked gas oil.

10. The method of claim 4 in which the unsaturated hydrocarbon oil is heavy catalytically cracked gas oil.

11. The method of claim 4 in which the unsaturated hydrocarbon oil is light catalytically cracked gas oil.

12. The method of claim 4 in which the unsaturated hydrocarbon oil is heavy coker gas oil.

13. The method of claim 4 in which the unsaturated hydrocarbon oil is light coker gas oil.

14. The method of claim 4 in which the hydrogen-containing gas is a recycle gas containing normally gaseous hydrocarbons as well as hydrogen.

References Cited by the Examiner

UNITED STATES PATENTS 2,953,519   9/1960   Bercik et al. _____ 208—216

DELBERT E. GANTZ, *Primary Examiner.*

ALPHONSO D. SULLIVAN, *Examiner.*